Figure 1:
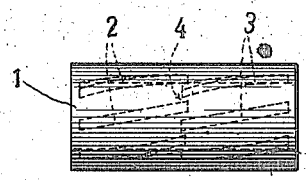

L. S. BACHE.
OILLESS BEARING.
APPLICATION FILED AUG. 15, 1914.

1,194,463.

Patented Aug. 15, 1916.

WITNESSES

INVENTOR
Leigh S. Bache,
BY
ATTORNEY

UNITED STATES PATENT OFFICE.

LEIGH S. BACHE, OF BOUNDBROOK, NEW JERSEY, ASSIGNOR TO BOUND BROOK OIL-LESS BEARING COMPANY, OF BOUNDBROOK, NEW JERSEY, A CORPORATION OF NEW JERSEY.

OILLESS BEARING.

1,194,463.      Specification of Letters Patent.      Patented Aug. 15, 1916.

Application filed August 15, 1914. Serial No. 857,000.

*To all whom it may concern:*

Be it known that I, LEIGH S. BACHE, a citizen of the United States, and a resident of Boundbrook, in the county of Somerset and State of New Jersey, have invented certain new and useful Improvements in Oilless Bearings, of which the following is a full, clear, and exact description, whereby any one skilled in the art may make and use the same.

The invention relates to what is commonly known as "oilless bearings". This term "oilless" or self-lubricating bearing is commonly used to indicate bearings which have inherent qualities of lubrication. These are ordinarily composed of metal with a lubricating material associated therewith and held thereby in such manner as to thoroughly lubricate the bearing and shaft. In the present instance, the bearing might be defined as composed of a combination of metal and substantially hard lubricating material, said material being held in suitable pockets in the metal portion of the shell. Thus the lubricant, as well as the metal of the bearing, coöperate to sustain the weights imposed by the shafts or like parts with which the bearing is used.

As hereinafter more specifically described, the bearing consists of a metallic shell or like part having a peculiar arrangement of retaining pockets or grooves therein, said grooves being arranged in sets offset with relation to each other to provide a maximum strength for the metal shell intermediate the ends of the bearing. In these sets of grooves or pockets there is tightly compressed and vulcanized a lubricating compound preferably containing graphite.

The particular form of bearing illustrated and hereinafter described and applicable for any purpose, is particularly well adapted for use in connection with oscillatory shafts, such as are used in spring shackles and the like. Bearings of this general type must of necessity be formed with comparatively thin metal walls and as it is necessary and desirable to provide as great a metal sustaining area as possible and at the same time provide for ample and adequate lubrication for the metal, the arrangement of the grooves is quite essential.

In my co-pending applications, Serial No. 825,355, filed March 17, 1914, and which has since matured into Patent 1,122,230 dated December 22, 1914, and 833,988, filed April 23, 1914, and which has since matured into Patent 1,122,565 dated December 29, 1914, I have illustrated and described bearings of the same general type having certain features of advantage in reference to the form and arrangement of retaining grooves. In one instance, the grooves are of a spiral form, the spiral being of exceedingly long pitch so that the grooves are slightly transverse to the elemental lines of the cylindrical bearing. The alternate grooves are relieved at one side to provide a peculiar shape of pocket having wide lubricating faces at the top so that the wiping action of the shaft, as it oscillates will give perfect lubrication. At the same time, a maximum mass of metal is provided for sustaining weights. In the second case, the grooves are arranged in a herring-bone form with the alternate grooves relieved at one side to provide the wide lubricating surface.

Both of the forms defined are very efficient but in a sense, lack metallic strength which is provided in the bearing hereinafter described. In forming these bearings, the grooves are cast into a substantially cylindrical shell and this shell is then packed with graphite or lubricating compound under very great pressure so that the grooves are completely filled with a lubricant which is almost as hard as the metal itself, particularly after the lubricant has been vulcanized. After the grooves are packed with the lubricant, the central bore is broached out and finished to size. Where a bearing of any considerable length is used, the compressing and broaching operation produces severe strains on the metallic shell and where the pockets are of continuous length, as illustrated in the prior applications above referred to, it not unfrequently happens that the strains crack the shells. The invention hereinafter defined overcomes this objection by arranging the grooves in sets and offsetting one of said sets of grooves with reference to the other. This provides a stiffening band of metal between the adjacent sets of grooves or pockets. The arrangement is such that a perfect lubrication is secured and all the advantages in the devices of my prior applications are retained with the additional feature of greater strength.

Figure 2:
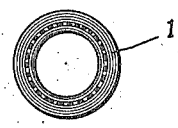
Figure 3:
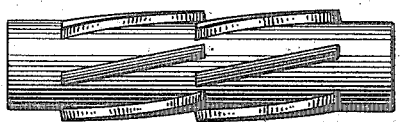
Figure 4:
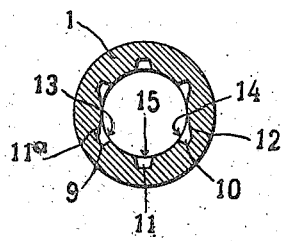
Figure 5:
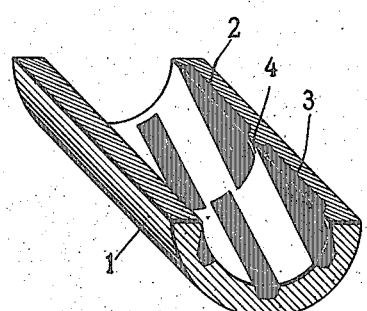
Figure 6:
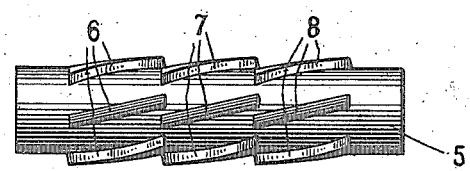

In the accompanying drawings: Figure 1 is a view in elevation of a bearing shell. Fig. 2 is an end view of the same. Fig. 3 is a plan view on enlarged scale of a core illustrating the arrangement of ribs which in the gearing shell become pockets. Fig. 4 is a cross-sectional view through a bearing shell. Fig. 5 is a perspective view of a section of the bearing. Fig. 6 illustrates a core providing for three bearing grooves.

Referring to the drawings the numeral 1 denotes a bearing shell which has interiorly arranged therein a plurality of sets of grooves 2 and 3, which are substantially in extension one of the other though slightly offset so that between the adjacent ends of the two sets of grooves, there is left solid metal as at 4. The adjacent ends of the sets 2 and 3 slightly overlap so that the lubricant of the grooves will be wiped across the intervening metal bridge 4. This metal bridge 4 of course extends entirely about the inner periphery of the bearing shell and provides metal the full thickness of the shell, which material increases the strength of the shell intermediate its ends.

In Fig. 6 provision is made for three sets of grooves by providing the core 5 with sets of ribs 6, 7, 8. This illustrates the possibility of breaking up the pockets or grooves into sets so that increased strength may be given to the bearing shell intermediate the adjacent ends of the sets of grooves and at various points throughout the length of the shell. Obviously, the number of sets of grooves is limited only by the dimensions of the bearing shell and the pitch of the grooves as said grooves must be of very long pitch and such a pitch as will not carry them, say more than forty-five degrees about the bearing. In fact, the best results are obtained by having the grooves of spiral form and of very long pitch so that the leading ends of each set of grooves will lie substantially in the same elemental lines of the cylindrical bearing. These grooves are of peculiar form. Referring particularly to Figs. 4 and 5, it will be seen that the grooves all have substantially the same width at their bottom but that the grooves 9 and 10 are quite different in cross-sectional form from the grooves 11. In other words, the alternate grooves 9 and 10 of each set of pockets are cut away at one side as at 11ª, 12 so that there is presented a substantially wide face of lubricant 13, 14 as compared with the face 15 of the groove 11. This arrangement provides for a maximum sustaining body of metal between the groove 11 and the grooves 9 and 10 and when the bearing is used with an oscillatory shaft, said shaft will, by its oscillation, alternately pick up lubricant from the pockets and owing to the beveled sides of the alternate grooves 9 and 10, there will be a tendency to repack the graphite or lubricant into the deepest part of the pockets. This effect pertains to each of the sets of grooves and the spiral arrangement of the grooves prevents an abrupt wiping of the lubricant as the shaft oscillates. Thus, there will be an even distribution of the lubricating material over the entire metallic surface of the bearing and the shaft. The offsetting of one set of spiral grooves with reference to the next succeeding set provides a full body of metal about the center of the bearing shell of Fig. 5 and at two points intermediate the ends of the bearing shell if formed on the core of Fig. 6. This reinforcing of the metal shell materially strengthens it so that under the heaviest duty or in broaching it or packing it, it will not crack out. There is a further advantage in offsetting the grooves and arranging them in individual sets. The co-efficient of expansion and contraction between the metallic shell and the material packed in the grooves differs slightly and where continuous lengths of lubricant are arranged in the bearing, there is a greater tendency for it to "work". This obviously results in disintegration and waste of the lubricating material. The grooves 11 have their side walls beveled just sufficiently to give proper drafts while the grooves 9 and 10 have their side walls 11ª and 12 nearly perpendicular from end to end. It follows that these alternate grooves expose a larger surface of lubricant than the intermediate grooves 11. This arrangement permits giving a maximum depth to the lubricant in all the pockets while the alternate pockets have a gradually tapering body of graphite. The deepest portion of the grooves is upon the advancing side of the groove so that with an oscillatory shaft, there is a tendency for the lubricant to be wiped off along the beveled sides to that of 11ª and 12 when moving in one direction and to be wiped and packed directly into the grooves and compacted at the deepest body of graphite when the shaft oscillates in the opposite direction. As a result, there is an even distribution of the lubricating material and there is a maximum metal support on either side of the center groove 11, while the beveled walls 11ª, 12 of the grooves 9 and 10 give added metal between said grooves and the next succeeding ones.

I am aware that it has been a common practice to provide spiral grooves extending completely around the inner periphery of the shell and to break these grooves at various points to provide a greater metal surface, but so far as known to me, spiral grooves of long pitch arranged in sets, each set slightly offset with reference to the other and arranged substantially in continuation one of the other along the axis of the bearing shell has not heretofore been employed. As herein set forth, I provide what is in effect a plurality of sets of grooves in extension one of the other along the bearing and with each set slightly offset with reference to the succeeding set. It will be noted that the grooves terminate within the ends of the bearing so that there is a full metal support at the ends which prevents breaking out of the lubricant.

What I claim as my invention and desire to secure by Letters Patent is:

1. In a bearing, a shell having a plurality of sets of spiral grooves of long pitch extending along the shell, and each set extending circumferentially entirely around the shell, the grooves of one set being offset at their ends with reference to those of the next set, thereby providing an intermediate circumferential body of metal at said offset, and a solid lubricant filling the said grooves.

2. A bearing shell having a plurality of sets of grooves of spiral form arranged in substantial continuation one of the other, the grooves of one set being slightly offset at their ends with reference to the grooves of an adjacent set whereby a full body of metal extends peripherally about the shell between the adjacent ends of the sets of grooves and a lubricant filling said grooves.

3. A bearing shell having a plurality of sets of spiral grooves of long pitch, each set extending entirely around the longitudinal axis of the bearing, the adjacent ends of the grooves of one set being slightly offset with reference to the ends of the adjacent set and the alternate grooves of each set being cut away at one side to provide a substantially wide opening and a lubricant filling said grooves.

4. A bearing shell having sets of spiral grooves of long pitch extending entirely around the longitudinal axis of the bearing, the grooves of one set being slightly offset at their ends and over-lapping the grooves of the adjacent set and the sets of grooves being arranged one in substantial extension of the other along the longitudinal lines of the bearing and a lubricant filling said grooves although separated by a circumferential body of metal the full thickness of the shell.

5. A bearing shell having sets of spirally formed grooves of long pitch, each set of grooves being arranged circumferentially concentric with the longitudinal axis of the bearing and entirely around it, the grooves of each set being at their ends offset with reference to the ends of the adjacent set of grooves and arranged one in substantial extension of the other longitudinally of the bearing, said sets of grooves being separated by a circumferential body of metal the full thickness of the shell, and the grooves being of substantially uniform depth and width at their bottoms, and alternate grooves being cut away on one side to form beveled walls, and an opening of greater width than is the width of the adjacent, intermediate, groove.

6. A bearing shell having sets of spiral grooves each set having its ends offset with reference to the grooves of the adjacent set and arranged longitudinally of the bearing, the advanced ends of the grooves of one set lying in substantially the same elemental lines as the advanced ends of the coöperating set and the adjacent ends of the grooves of contiguous sets being separated by a band of metal concentric with the longitudinal axis of the bearing and of the thickness of the shell and a lubricant filling said grooves.

7. A bearing shell having a plurality of sets of spiral grooves of long pitch terminating within the ends of the bearing shell, each set of grooves being offset at their ends with reference to the ends of the adjacent set of grooves, the leading ends of the successive sets of grooves lying in substantially the same elemental lines of the bearing and a lubricant filling said grooves with the adjacent ends of the grooves of successive sets separated by a circumferential body of metal of the thickness of the shell.

LEIGH S. BACHE.

Witnesses:
 Geo. J. Smalley,
 S. A. King.